United States Patent
Bosmans et al.

(10) Patent No.: US 6,902,154 B2
(45) Date of Patent: Jun. 7, 2005

(54) GAS-LIQUID CONTACT TRAY HAVING MULTIPLE DOWNCOMERS

(75) Inventors: Bernardinus Henricus Bosmans, Amsterdam (NL); Charu Ehrenreich-Gureja, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 10/204,064

(22) PCT Filed: Feb. 16, 2001

(86) PCT No.: PCT/EP01/01814

§ 371 (c)(1),
(2), (4) Date: Aug. 16, 2002

(87) PCT Pub. No.: WO01/60488

PCT Pub. Date: Aug. 23, 2001

(65) Prior Publication Data

US 2003/0038385 A1 Feb. 27, 2003

(30) Foreign Application Priority Data

Feb. 16, 2000 (EP) .......................... 00200523

(51) Int. Cl.⁷ ................................. B01F 3/04
(52) U.S. Cl. ................... 261/114.1; 261/114.5
(58) Field of Search ........................ 261/114.1, 114.5

(56) References Cited

U.S. PATENT DOCUMENTS

| | | | |
|---|---|---|---|
| 2,682,395 A | * 6/1954 | Claridge et al. | ......... 261/114.1 |
| 3,410,540 A | 11/1968 | Bruckert | |
| 3,463,464 A | 8/1969 | Nutter et al. | |
| RE27,908 E | 1/1974 | Nutter | |
| 4,361,469 A | * 11/1982 | Trutna | ......................... 203/99 |
| 4,550,000 A | 10/1985 | Bentham | |
| 4,627,941 A | 12/1986 | Bentham | |
| 5,098,615 A | 3/1992 | Resetarits | |
| 5,120,474 A | 6/1992 | Binkley et al. | |
| 5,223,183 A | 6/1993 | Monkelbaan et al. | |
| 5,318,732 A | 6/1994 | Monkelbaan et al. | |
| 5,382,390 A | 1/1995 | Resetarits et al. | |
| 5,454,989 A | 10/1995 | Nutter | |
| 5,547,617 A | 8/1996 | Lee et al. | |
| 5,911,922 A | 6/1999 | Hauser et al. | |

FOREIGN PATENT DOCUMENTS

| | | |
|---|---|---|
| BE | 584 . 426 | 11/1959 |
| DE | 764103 | 9/1952 |
| EP | 0 155 056 | 9/1985 |
| EP | 0 882 481 A1 | 9/1998 |
| GB | 1 416 731 | 12/1975 |
| GB | 1 416 732 | 12/1975 |
| GB | 1 422 131 | 1/1976 |
| GB | 1 422 132 | 1/1976 |
| WO | 96 26779 | 9/1996 |
| WO | 97 37741 | 10/1997 |
| WO | 98 28056 | 7/1998 |
| WO | 99 12621 | 3/1999 |

OTHER PUBLICATIONS

Distillation Design, Henry Z. Kister. McGraw–Hill Inc., 1992, pp. 260–267.

* cited by examiner

Primary Examiner—Scott Bushey
(74) Attorney, Agent, or Firm—Charles W. Stewart

(57) ABSTRACT

Gas-liquid contact tray comprising a bubble area and a plurality of downcomers having a downcomer opening, which downcomer openings are spaced in the bubble area, such that, when in use, a liquid enters the downcomer opening from opposite sides of the downcomer opening, wherein the downcomer opening and downcomer is provided with at least two flow directing plates, wherein each flow directing plate has an upper end which extends above the tray and is inclined towards the direction of the liquid flowing towards the downcomer opening.

23 Claims, 1 Drawing Sheet

GAS-LIQUID CONTACT TRAY HAVING MULTIPLE DOWNCOMERS

The invention is related to a gas-liquid contact tray comprising a bubble area and a plurality of downcomers having a downcomer opening, which downcomer openings are spaced in the bubble area, such that, when in use, a liquid enters the downcomer opening, as seen in a horizontal plane, from opposite sides of the downcomer opening. Such trays can be used in gas liquid contacting devices. A typical use of these trays is as distillation column internals.

BACKGROUND OF THE INVENTION

Such a gas-liquid contacting tray is known from GB-A-1422131. This publication describes a gas-liquid contact tray comprising a bubble area and a plurality of rectangular downcomers. The downcomer openings are so spaced in the bubble area that one downcomer opening is surrounded with bubble area at two or more of its four sides. This results in that, when the tray is used, liquid present in the space above the bubble area will enter the downcomer opening from opposite sides of the downcomer. When such trays are used in a gas-liquid contacting column two consecutive trays are so arranged that the lower end of a downcomer of the upper tray is oriented above bubble area of the tray below.

U.S. Pat. No. 5,382,390 also describes a gas-liquid contacting tray having a plurality of rectangular downcomers placed in the bubble area, such that liquid will enter the downcomer opening from two opposite sides. Anti-jump baffles comprising a vertical plate are centrally mounted in the downcomer opening parallel to the longitudinal downcomer sidewalls. According to this publication the anti-jump baffle is present to avoid the sometimes very powerful horizontal movement of suspended liquid droplets above the tray. By placing such a baffle liquid passing horizontally over the downcomer inlet is intercepted and directed into the downcomer.

U.S. Pat. No. 5,547,617 also describes a gas-liquid contacting tray having a plurality of rectangular downcomers placed in the bubble area, such that liquid will enter the downcomer opening from two opposite sides. As in U.S. Pat. No. 5,382,390, an anti-jump baffle is present in the downcomer opening.

When trying to increase the liquid and/or gas flows of the gas-liquid contacting columns as described above a maximum load will be observed. Higher loads will result in that the column fails to function as a liquid-gas contactor or separator due to a phenomena known as flooding. Flooding is described as excessive accumulation of liquid inside the column. The well known flooding mechanisms are downcomer back-up, jet flooding and downcomer choking. These mechanisms are described in Distillation Design, Henry Z. Kister, McGraw-Hill Inc, 1992, pages 267–291. According to this publication downcomer back-up is due to a build-up of liquid inside the downcomer causing the liquid to back-up on the tray leading to liquid accumulation on that tray. The liquid height in the downcomer is determined by the tray pressure drop, liquid height on the tray and frictional losses in the downcomer and downcomer slot area. Jet flooding or entrainment flooding is caused by a too high gas velocity leading to the entrainment of liquid, either by droplets or froth, to the tray above. The liquid will accumulate and leads to flooding. Downcomer choking is caused by a too high aerated liquid velocity in the downcomer. At a certain velocity the friction losses in the downcomer and downcomer entrance become excessive, and the frothy gas-liquid mixture cannot be transported to the tray below, causing liquid accumulation on the tray. With the term froth is to be understood any gas-liquid mixture present on the tray not depending on any flow regime.

German patent publication 764103 describes the use of flat and curved impingement plates in the downcomer opening to limit the froth height in the downcomer, which in turn prevents downcomer back-up. The publication is directed to so-called cross-over trays configurations for use in so-called foaming gas-liquid systems. In such a cross-over configuration the flow of gas-liquid towards the downcomer opening is only from one side. No indication is given that such a plate would prevent downcomer choking.

SUMMARY OF THE INVENTION

The present invention aims to provide a gas-liquid contacting tray as described above which overcomes the problems of downcomer choking or permits a higher gas and/or liquid loads before downcomer choking is observed. These problems are often associated with non-foaming systems. Thus a tray is aimed at having an improved capacity.

This aim is achieved by the following tray.

Gas-liquid contact tray comprising a bubble area and a plurality of downcomers having a downcomer opening, which downcomer openings are spaced in the bubble area, such that, when in use, a liquid enters the downcomer opening from opposite sides of the downcomer opening, wherein the downcomer opening and downcomer is provided with at least two flow directing plates, wherein each flow directing plate has an upper end which extends above the tray and is inclined towards the direction of the liquid flowing towards the downcomer opening.

It has been found that when the tray according to the invention is used in a gas-liquid contacting column an improved capacity is observed. A further advantage is that the directing plates can be added to existing trays having multiple downcomers arriving at a tray according to the invention. This makes it possible to improve capacity of existing distillation columns.

The gas-liquid contact tray according to the invention will typically comprise a circular bubble area and a plurality of downcomer openings spaced in this bubble area. The downcomer opening may be any form, for example, rectangular, square or circular. For the present invention it is essential that some or all of the downcomer openings have bubble area along opposite sides, in order to have a liquid entering the downcomer opening from opposite sides of the downcomer opening. In case of rectangular shaped downcomer openings bubble area along either longitudinal side will be present. Square or circular shaped openings are preferably spaced in the bubble area, resulting in that each downcomer opening will receive liquid from at least opposite sides.

From this bubble area and from the space there above a mixture of gas and liquid, the froth, will move towards the downcomer opening. The two or more substantially opposite streams entering the downcomer opening will meet each other somewhere above the downcomer opening. Applicants believe that because of the directing plates present at this meeting point of opposite flows the capacity increase is achieved.

DETAILED DESCRIPTION OF THE INVENTION

The invention shall be described in greater detail below.

Preferably a weir is present on the tray. A weir is a device positioned on or about on the boundary of the bubble area and the downcomer opening which ensures that a certain pre-selected amount of liquid is present on the upper surface of the bubble area. The height of the weir may be selected from conventional values known to one skilled in the art. The weir may suitably be inclined towards the direction of the liquid flowing towards the downcomer opening. To further increase the liquid handling capacity of the tray the overflow weir is preferably inclined towards the bubble area, such that an imaginary line, drawn from the top of the overflow weir to the base of the overflow weir, forms an angle α with the horizontal plane of the tray which is smaller than 80° and more preferably larger than 30°. The overflow weir height lies preferably in the range from 25 mm to ⅙ of the height of the tray spacing.

The number of directing plates is more than one, preferably from 2 to 10 and more preferably from 4 to 6. This number will for example depend on the size of the downcomer opening, the gas-liquid system to be contacted or separated and on the gas/liquid load on the tray. The upper part of the directing plate will be inclined, relative to the vertical, towards the direction of the liquid-gas mixture flowing from a position above the nearest bubble area towards the side of the downcomer opening. When substantially the same amount of froth is expected to flow from both sides of the downcomer it is preferred to have the same number of directing plates inclined towards each of the flow directions. When more froth is expected to flow from one side, more directing plates having an upper end being inclined in that direction may be present than directing plates pointing towards the side where less froth is flowing from.

When the downcomer opening is rectangular shaped an anti-jump baffle may be present as known from the earlier referred to U.S. Pat. No. 5,382,390. The flow directing plates can then be advantageously positioned at either side of the anti-jump baffle.

The directing plates suitably have a lower end which is directed towards the downcomer opening. The lower end may be positioned above tray level. Preferably the lower part of the directing plate extends downwards into the downcomer.

The lower part of the directing plates may be vertically positioned or inclined relative to each other. The lower end of the directing plate is preferably positioned at the level of the upper end of the weir or below. In the absence of a weir, the lower end is preferably positioned at tray level or below. The length of the lower end below the tray level or top weir level will depend, for example, on the spacing between the individual directing plates. Smaller spacing will generally require that this length increases. Optionally the different directing plates may extend with different lengths into the downcomer.

The upper part of the directing plates may be for example flat, hooked or curved. For practical plate manufacturing reasons a hooked design is favoured. The upper end of the directing plate may extend to a vertical position above the bubble area. The distance between two consecutive plates will preferably increase at increasing height above the tray. This may result in that the directing plates closest to the bubbling area will be more inclined relative to the vertical when compared to the directing plates in the centre of the downcomer. A possible embodiment is when the directing plates are flat and positioned inclined relative to each other, wherein the distance between the plates gradually increases with the height above the tray. Preferably the upper end of the plate is inclined such that its tangent line makes an angle of between 0 and 100° with the vertical, wherein the plates located in the centre will be less inclined towards the bubble area than the plates located nearest the bubble area. More preferably the two or more of such plates nearest the bubble area are inclined such that its tangent line makes an angle of between 80 and 95°, and most preferably 90° with the vertical.

Suitably the horizontal distance at top weir level (or tray level in the absence of a weir) between two consecutive directing plates inclined in the same direction is between from 0.015 m to 0.1 m and preferably between from 0.015 m to 0.05 m.

The length of the directing plate above the tray will depend on the shape of the directing plate, typical gas and liquid loading on the tray and the kind of gas and liquid to be contacted or separated. Suitably the directing plates will extend to between from 5% to 85% of tray spacing above the tray surface, wherein tray spacing is the distance between two consecutive contacting trays when placed in a column. Suitably the tray spacing is between from 0.2 m to 1 m. Preferably the directing plates placed towards the downcomer centre increase in height above the tray surface relative to the plates placed more near to the bubble area.

The directing plates may be solid, partly perforated, perforated with a varying open area or with a constant open area. The shape of the perforations might be any shape. For example materials like expanded metal or other corrugated sheet material could be used to make the directing plates. Preferably the directing plate is a solid metal sheet.

It has been found advantageous in some cases to increase the overflow weir height of an existing tray when adding flow directing plates to arrive at a tray according to the invention. In such circumstances a pre-fabricated insert may be used. Such an insert will consist of the flow directing plates fixed to a weir having the dimensions of the downcomer opening. The weir of the insert is made such that when positioned in the downcomer opening the lower part of the weir insert fixes itself to the inside of the downcomer walls and the upper part of the weir insert extends to a higher level than the existing weir.

Various possible tray layouts of the downcomer openings present in the bubble area of the tray are known to one skilled in the art. Examples of such tray lay outs which may be advantageously be used in combination with the present invention are disclosed in GB-A-1422132, GB-A-1422131, GB-A-1416732, GB-A-1416731, BE-584426, U.S. Pat. No. 4,550,000, EP-A-882481, WO-9626779, U.S. Pat. No. 5,382,390, U.S. Pat. No. 3,410,540, U.S. Pat. No. 5,318,732, EP-A-155056, U.S. Pat. No. 5,223,183 and U.S. Pat No. 5,098,615. Preferably the downcomer has a rectangular horizontal cross section having a longer length than its width. The upper end of the directing plates will then run parallel to the longitudinal sides of the downcomer. With a rectangular cross-section is also meant downcomer openings wherein its smaller end sides nearest to the circumferential of the tray run along this circumferential, resulting that these smaller end sides are not parallel arranged relative to each other. This design of the downcomer opening ensures a maximum opening area on the tray. Downcomer openings having this design will also be referred to as rectangular downcomers because the overall form of these openings is almost rectangular.

For the present invention it is not critical which kind of openings are used in the bubble area of the tray. Examples of possible openings are bubble cap openings, sieve tray openings, valve tray openings, and fixed valve openings.

Examples of these openings can be found in general text books such as the aforementioned general textbook of Kister on pages 260–267 and in U.S. RE. Pat. No. 27908, U.S. Pat. No. 5,120,474, WO-A-9828056, WO-A-9737741, U.S. Pat. No. 5,911,922, U.S. Pat. No. 3,463,464 and U.S. Pat. No. 5,454,989.

The invention shall be illustrated with the following Figures.

Figure 1:
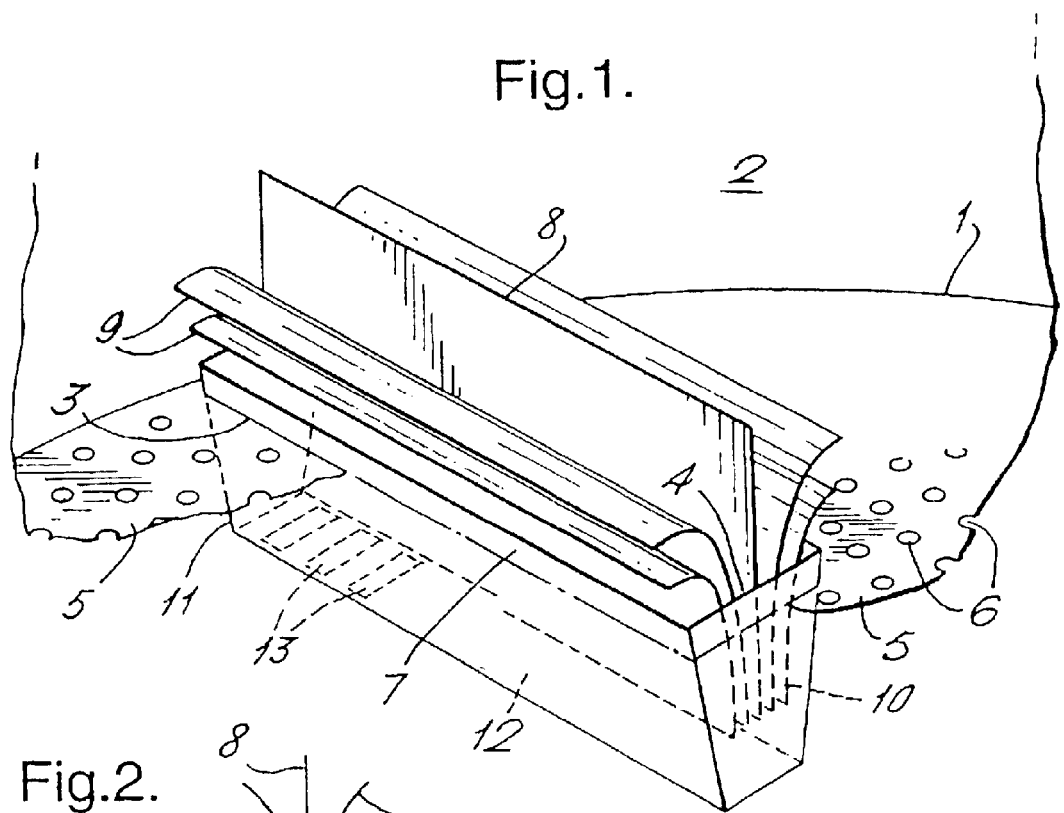
FIG. 1 is three dimensional view of part of a tray according the invention as placed in a column.

FIG. 1 is three dimensional view of part of a tray (1), part of a column wall (2) and a downcomer (3) having a rectangular downcomer opening (4). As shown bubble area (5) is present along both elongated sides of the downcomer opening (4). The bubble area (5) is provided with openings (6) for passage of upwardly moving gas. The downcomer (3) is also provided with a weir (7) and an anti jump baffle (8). Two flow directing plates (9) are positioned at either side of the anti jump baffle (8). Because the flows towards the rectangular downcomer opening (4) will be predominately from both of the elongated sides of the downcomer (3), the flow directing plates (9) only point towards these elongated sides. For this reason the directing plates (9) for rectangular downcomers can be of a simple design and are equally simple to fabricate. The flow directing plates (9) as shown are substantially parallel and vertically arranged at their lower end (10). The upper end is curved such that they point towards the opposite liquid flows flowing, when in use, from the spaces above bubble area (5) into the downcomer opening (4). The elongated upper end runs parallel to the elongated sides of the downcomer (3). The downcomer walls (11) point towards each other in the flow direction of the liquid. The lower end of the downcomer is provided with a cover (12). In cover (12) a plurality of openings (13) are present.

Figure 2:
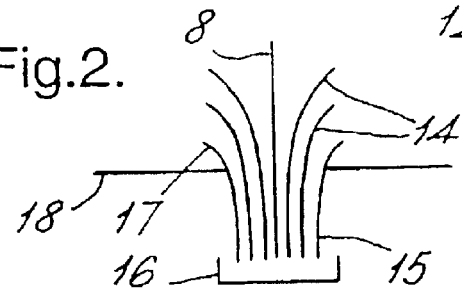
FIG. 2 is a detail of a tray according the invention showing a cross-sectional side view of a rectangular downcomer having a seal pan.

FIG. 2 illustrates another embodiment wherein the lower end of the flow directing plates (14) and the downcomer walls (15) extend into the same seal pan (16). FIG. 2 also shows a weir (17) and part of the bubble area (18). A seal pan can be omitted, for example when the length and the intermediate distance between the downcomer walls and the directing plates are such that, when in use, a liquid seal is formed due to liquid back-up between the plates (14) and between the plates and the downcomer walls (15).

Figure 3:
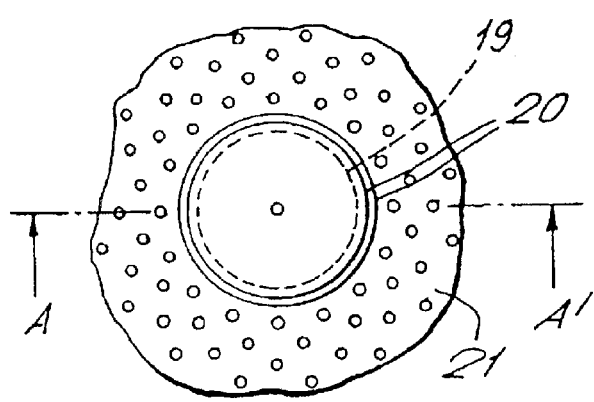
FIG. 3 is a detail of a tray according the invention showing the top view of a circular downcomer.

FIG. 3 shows a top view of a circular downcomer (19) having circular directing plates (20) and part of the bubble area (21) positioned around the downcomer (19).

Figure 4:
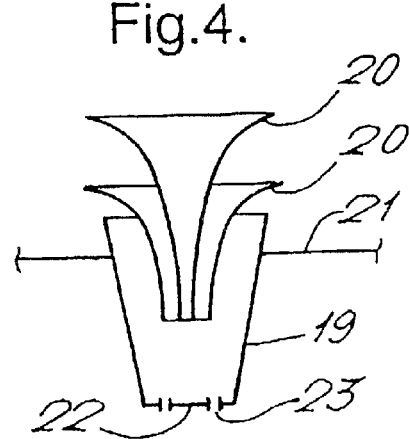
FIG. 4 is a cross-sectional view along line AA' of FIG. 3.

FIG. 4 shows a cross-sectional view along line AA' of such a circular downcomer (19). A cover (22) at the lower end provided with liquid discharge openings (23) is shown.

The tray according to the invention is preferably used in a gas-liquid contacting or separation column, which column is provided with these trays axially spaced away from each other. Contacting can be an absorption process wherein a downwardly moving liquid is contacted with an upwardly moving gas. Separation is typically a distillation process to separate one or more components from a feed. Suitably the feed of a distillation process is supplied to an intermediate position in the column, wherein trays are present above and below said inlet position. Such a column is further provided with reboiler, condensation and reflux means.

The column is preferably used for contacting or separation of gas-liquid systems of the non-foaming type, because downcomer back-up is a more frequent problem for such systems. Non-foaming systems have a higher clear liquid velocity in the downcomer than foaming systems. Examples of foaming systems are amine-absorbers, sour water strippers, glycerol contactors and amine absorbers. Examples of non-foaming systems are $H_2S$ strippers and hydrocarbon-hydrocarbon separation, for example de-propanisers, de-ethanisers, de-methanisers, atmospheric crude distillation and the vacuum distillation of petroleum fractions boiling from above 350° C.

The invention shall be illustrated with the following non-limiting examples.

EXAMPLE 1

A test unit is provided with 3 two-pass rectangular trays, provided with rectangular downcomers. The downcomers having bubble area at both sides are provided with an anti-jump baffle extending 80% of the tray spacing and at either side of the anti-jump baffle two directing plates are positioned as illustrated in FIG. 1 and having an upper end which is so positioned that the tangent line makes an angle of 60° with the horizontal plane. The horizontal distance between the plates at weir level is 0.025 m. To this column a liquid and gas flow is introduced at respective upper and lower ends. At an air load of 680 $m^3$/h it is observed that the maximum attainable water load is more than 36.2 $m^3$/h.

Comparative Experiment

Example 1 is repeated except that a downcomer is used having no flow directing plates. At an air load of 680 $m^3$/h it is observed that the maximum attainable water load is 29 $m^3$/h.

The above results show that a liquid capacity increase of at least 25% can be achieved when a tray is used according to the invention.

What is claimed is:

1. A gas-liquid contact tray comprising a bubble area and a plurality of downcomers defining a plurality of downcomer openings, wherein each downcomer opening of said plurality of downcomer openings has opposing sides with said bubble area along each side of said opposing sides, wherein each downcomer opening of said plurality of downcomer openings is spaced in said bubble area, such that, when in use, a liquid enters each downcomer opening of said plurality of downcomer openings from opposite sides of each downcomer opening of said plurality of downcomer openings, wherein each side of said opposing sides of each downcomer opening of said plurality of downcomers is provided with at least two flow directing plates, wherein each flow directing plate of said at least two flow directing plates has an upper end and a lower end, wherein each upper end of each of said at least two flow directing plates extends above said bubble area and is inclined towards the direction of the liquid flowing towards said downcomer opening, wherein the lower ends of said at least two flow directing plates are substantially parallel with each other and extend vertically downward into the downcomer; wherein the downcomer opening is rectangular having a length longer than its width and wherein the upper end of the directing plates run parallel to the longitudinal side of the downcomer opening; and wherein a vertical anti-jump baffle is present along the longitudinal center line of the downcomer opening and wherein the flow directing plates are positioned at either side of the anti-jump baffle.

2. The tray according to claim 1, wherein the number of directing plates is from 2 to 10.

3. The tray according to claim 2, wherein the horizontal distance at top weir level, or tray level in the absence of a weir, between two consecutive directing plates which are inclined in the same direction is between from 0.015 to 0.05 m.

4. The tray according to claim 3, wherein the lower end of the directing plate is positioned at the level of the upper end of the weir or below or, in the absence of a weir, the lower end of the directing plate is positioned at tray level or below.

5. The tray according to claim 4, wherein the directing plates extend to between from 5% to 85% of tray spacing above the tray surface, wherein tray spacing is the distance between two consecutive trays when placed in a gas-liquid contact column.

6. A gas-liquid contacting column provided with a plurality of trays according to claim 1, axially spaced from each other.

7. A gas-liquid contacting column provided with a plurality of trays according to claim 2, axially spaced from each other.

8. A gas-liquid contacting column provided with a plurality of trays according to claim 3, axially spaced from each other.

9. A gas-liquid contacting column provided with a plurality of trays according to claim 4, axially spaced from each other.

10. A gas-liquid contacting column provided with a plurality of trays according to claim 5, axially spaced from each other.

11. A gas-liquid contact tray comprising a bubble area and a plurality of downcomers defining a plurality of downcomer openings, wherein each downcomer opening of said plurality of downcomer openings has opposing sides with said bubble area along each side of said opposing sides, wherein each downcomer opening of said plurality of downcomer openings is spaced in said bubble area, such that, when in use, a liquid enters each downcomer opening of said plurality of downcomer openings from opposite sides of each downcomer opening of said plurality of downcomer openings, wherein each side of said opposing sides of each downcomer opening of said plurality of downcomers is provided with at least two flow directing plates, wherein each flow directing plate of said at least two flow directing Plates has an upper end and a lower end, wherein each upper end of each of said at least two flow directing plates extends above said bubble area and is inclined towards the direction of the liquid flowing towards said downcomer opening, wherein the lower ends of said at least two flow directing plates are substantially parallel with each other and extend vertically downward into the downcomer; and, wherein a weir is present on the boundary of bubble area and downcomer opening.

12. The tray according to claim 11, wherein the number of directing plates is from 2 to 10.

13. The tray according to claim 12, wherein the horizontal distance at top weir level between two consecutive directing plates which are inclined in the same direction is between from 0.015 to 0.05 m.

14. The tray according to claim 13, wherein the lower end of the directing plate is positioned at the level of the upper end of the weir.

15. The tray according to claim 14, wherein the directing plates extend to between from 5% to 85% of tray spacing above the tray surface, wherein tray spacing is the distance between two consecutive trays when place in a gas-liquid contact column.

16. The tray according to claim 15, wherein the downcomer opening is rectangular having a length longer than its width and wherein the upper end of the directing plates run parallel to the longitudinal side of the downcomer opening.

17. A gas-liquid contacting column provided with a plurality of trays according to claim 11, axially spaced from each other.

18. A gas-liquid contacting column provided with a plurality of trays according to claim 12, axially spaced from each other.

19. A gas-liquid contacting column provided with a plurality of trays according to claim 13, axially spaced from each other.

20. A gas-liquid contacting column provided with a plurality of trays according to claim 14, axially spaced from each other.

21. A gas-liquid contacting column provided with a plurality of trays according to claim 15, axially spaced from each other.

22. A gas-liquid contacting column provided with a plurality of trays according to claim 16, axially spaced from each other.

23. A gas-liquid contact tray comprising a bubble area and a downcomer defining a downcomer opening, wherein said downcomer opening is spaced in the bubble area, such that, when in use, a liquid enters said downcomer opening from opposite sides of said downcomer opening, wherein said downcomer is provided with at least two flow directing plates, wherein each flow directing plate of said at least two flow directing plates has an upper end which extends above said bubble area and is inclined towards the direction of liquid flowing towards said downcomer opening, wherein said downcomer opening is rectangular having a length longer than its width and wherein the upper end of the directing plates run parallel to the longitudinal side of the downcomer opening, and wherein a vertical anti-jump baffle is present along the longitudinal center line of the downcomer opening and wherein the flow directing plates are positioned at either side of the anti-jump baffle.

* * * * *